(12) United States Patent  
Ishibashi et al.

(10) Patent No.: US 7,636,200 B2  
(45) Date of Patent: Dec. 22, 2009

(54) PROJECTOR

(75) Inventors: Osamu Ishibashi, Matsumoto (JP); Kazuhiro Nishida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 11/955,060

(22) Filed: Dec. 12, 2007

(65) Prior Publication Data

US 2008/0165407 A1 Jul. 10, 2008

(30) Foreign Application Priority Data

Jan. 5, 2007 (JP) .............................. 2007-000438

(51) Int. Cl.  
*G02B 27/14* (2006.01)

(52) U.S. Cl. ..................... 359/634; 359/629; 362/268; 353/34

(58) Field of Classification Search ................ 359/629, 359/634; 362/268; 353/34  
See application file for complete search history.

(56) References Cited

U.S. PATENT DOCUMENTS 6,863,419 B2 * 3/2005 Kodama et al. ............. 362/268

FOREIGN PATENT DOCUMENTS

JP A-2000-241882 9/2000  
JP A-2007-057810 3/2007

* cited by examiner

*Primary Examiner*—Joseph Martinez  
(74) *Attorney, Agent, or Firm*—Oliff & Berridge, PLC

(57) ABSTRACT

To provide a projector capable of increasing F number of an illumination system without enlarging the size of the illumination system or the like.

A combining lens 43a operating in cooperation with a superimposing lens 35 is provided only in a first section between a first dichroic mirror 41a and a red light reflection mirror 42a as a bending mirror on a first optical path OP1 extending from the superimposing lens 35 to a first liquid crystal display panel 61r. Thus, the F number of an illumination system 30 associated with blue light can be controlled with high degree of freedom, and the number of lenses constituting a color separation and light guide system 40 and the illumination system 30 does not increase. Moreover, the incident angle of illumination light does not become large around the first liquid crystal display panel 61r, and thus the telecentric characteristics of the illumination system 30 associated with blue light can be secured.

10 Claims, 2 Drawing Sheets

PROJECTOR

TECHNICAL FIELD

The present invention relates to a projector which modulates illumination light by using a liquid crystal light valve and projects the modulated image light.

BACKGROUND ART

A typical related-art projector includes a light source which emits substantially white light, an illumination system which equalizes light emitted from the light source and converts the equalized light into polarized light, a color separation system which divides the light having passed the illumination system into lights on three color optical paths, three liquid crystal panels illuminated by the three color illumination lights, a cross dichroic prism which combines respective images entered from the three liquid crystal panels, and a projection lens which enlarges and projects the combined image.

According to this type of projector, a field lens is provided opposed to and in the vicinity of each light entrance surface of the liquid crystal panels such that the illumination system can be telecentric, that is, central light of the illumination light can enter the respective liquid crystal panels in the direction perpendicular to the entrance surfaces of the liquid crystal panels. In addition, a certain type of this projector reduces the enterable angle of illumination light for entering the liquid crystal panel by disposing a concave lens between a superimposing lens and a field lens on a short optical path and a common optical path of the optical paths divided by the illumination system.

[Patent Reference 1] JP-A-2000-241882

DISCLOSURE OF THE INVENTION

Problems That the Invention Is To Solve

According to the method of disposing the concave lens between the superimposing lens and the field lens to control the enterable angle of illumination light, however, the number of components increases by the addition of the concave lens, and the sizes of the illumination system and the projector rise with the addition of the concave lens. Moreover, in the structure controlling the enterable angle by using the concave lens, the F number of the illumination system increases by the amount corresponding to the negative refractive power produced by the concave lens. In this case, the light utilization efficiency decreases.

Brightness of light basically increases as the F number decreases. However, there is a certain optimal value for brightness since limiting factors such as the size of the components and the F number of the projection lens also exist. The method of using the concave lens increases the F number, and therefore lowers brightness in most cases.

In both cases where the concave lens is inserted and where the concave lens is not inserted, the field lens disposed upstream from the liquid crystal panel can be eliminated. However, when the field lens is simply removed, the incident angle of light entering from the position having the height of the image into the peripheral area of the liquid crystal panel becomes large. In this case, the visibility angle increases and thus performance of the projector lowers (such as lowering of contrast and color unevenness). Moreover, the degree of freedom for determining the F number of the illumination system decreases.

Accordingly, it is an object of the invention to provide a projector capable of increasing brightness by reducing the F number of the illumination system without enlarging the size of the illumination system or the like.

Means For Solving the Problems

In order to achieve the above object, a projector according to the invention includes: (a) a lighting device having a light source device which emits source light, first and second lens arrays each of which divides the source light emitted from the light source device into a plurality of partial lights, and a superimposing lens which has positive refractive power and supplies the partial lights emitted from the first and second lens arrays to a target illumination area such that the partial lights can be superimposed on the illumination area; (b) a color separation and light guide system having a first color separating mirror which separates illumination light emitted from the lighting device into first color light and other color light, a second color separating mirror which separates second color light and third color light contained in the other color light, and a bending mirror which further reflects the first color light reflected by the first color separation mirror to bend the optical path of the first color light; (c) first through third liquid crystal light valves each of which modulates corresponding one of the first through third color lights separated by the color separation and light guide system according to image information; (d) a light combining system which combines image lights in respective colors modulated by the first through third liquid crystal light valves; and (e) a projection system which projects the combined image light produced by the light combining system. According to this projector, an optical path extending from the superimposing lens to the first liquid crystal light valve has only a combining lens disposed in a first section between the first color separating mirror and the bending mirror. Also, an optical path extending from the superimposing lens to the second liquid crystal light valve has only a combining lens disposed in a second section between the first color separating mirror and the second color separating mirror.

According to this projector, the optical path extending from the superimposing lens to the first liquid crystal light valve has only the combining lens disposed in the first section between the first color separating mirror and the bending mirror. Thus, the F number of the illumination system associated with the first color light can be controlled with high degree of freedom by using this combining lens. Since the combining lens is provided in place of the field lens disposed immediately before the first liquid crystal light valve in the related art, the number of lenses constituting the color separation and light guide system and other components does not increase. Accordingly, the cost and size of the projector do not rise. Moreover, since the projector includes the combining lens instead of the field lens, the incident angle of the illumination light does not become large around the first liquid crystal light valve. Accordingly, the telecentric characteristics of the illumination system associated with the first color light can be secured.

Furthermore, according to this projector, the optical path extending from the superimposing lens to the second liquid crystal light valve has the combining lens disposed only in the second section between the first color separating mirror and the second color separating mirror. Thus, the F number can be controlled with high degree of freedom, and the cost and size of the projector do not increase by preventing from increasing number of lenses for the same reason as in the case of the combination lens disposed in the first section. Moreover, the incident angle of the illumination light does not become large around the second liquid crystal light valve, and therefore the telecentric characteristics of the illumination system associated with the second color light can be secured.

According to the projector in a specific example or aspect of the invention, both the combining lens disposed in the section between the first color separating mirror and the bending mirror and the combining lens disposed in the section between the first color separating mirror and the second color separating mirror have refractive power which mutually corrects color aberration. According to this structure, the first liquid crystal light valve and the second liquid crystal light valve can be illuminated by the substantially equivalent optical systems, and therefore no loss is produced by the illumination of the first and second liquid crystal light valves.

According to the projector in another example, the combining lens disposed in the first section is a positive single lens located at a position in the range from (¼)L to (¾)L from the final end surface of the superimposing lens assuming that the distance between the final end surface of the superimposing lens and the light modulation surface of the first liquid crystal light valve is L.

When the combining lens which is disposed in the first section is disposed at a distance shorter than (¼)L from the final end surface of the superimposing lens, the combining lens is positioned away from the first liquid crystal light valve. Thus, the refractive power of the combining lens needs to be decreased when the F number of the illumination system is decreased to form images of the first lens array on the liquid crystal light valve without enlarging the superimposing lens. In this case, the condition of the light in the first liquid crystal light valve is considerably shifted from the telecentric condition. Thus, the sizes of the superimposing lens and the combining lens increase and accordingly the size of the second lens array increase. When the combining lens which is disposed in the first section is disposed at a distance longer than (¾)L from the final end surface of the superimposing lens, the combining lens is positioned close to the first liquid crystal light valve. Thus, the refractive power of the combining lens becomes excessively large when the F number of the illumination system is decreased to form images of the first lens array on the first liquid crystal light valve. In this case, the condition of the illumination light in the first liquid crystal light valve is considerably shifted from the telecentric condition. In addition, aberration increases.

According to the projector in a further example, the combining lens disposed in the second section is a positive single lens located at a position in the range from (¼)L to (¾)L from the final end surface of the superimposing lens assuming that the distance between the final end surface of the superimposing lens and the light modulation surface of the second liquid crystal light valve is L. According to this structure, the F number of the illumination system can be relatively easily decreased when the combining lens is positioned at a distance equal to or longer than (¼)L, and thus the telecentric characteristics of the illumination system can be secured for the same reason as in the case of the combining lens disposed in the first section. When the combining lens is disposed at a distance equal to or shorter than (¾)L, the telecentric characteristics of the illumination system can be similarly secured even at the time of decreased F number.

According to the projector in a still further example of the invention, the first through third liquid crystal light valves have no micro-lens. According to this structure, the advantage of the brightness of light on the liquid crystal display panel enhanced by decreasing the F number of the illumination system achieved through the arrangement of the combining lens as above can be utilized in the optical system located downstream from the liquid crystal display panel. That is, when the liquid crystal display panel including the micro-lens is used, there is a possibility that light not used in the optical system disposed downstream from the liquid crystal display panel increases.

Best Mode for Carrying out the Invention

FIG. 1 illustrates a concept of a structure of optical systems included in a projector according to a first embodiment of the invention.

A projector 10 shown in the figure is an optical apparatus which modulates light emitted from a light source according to image information to form an color optical image, and enlarges and projects the optical image on a screen. The projector 10 includes a light source lamp unit 20, an illumination system 30, a color separation and light guide system 40, a light modulation unit 60, a cross dichroic prism 70, and a projection system 80. The light source lamp unit 20 and the illumination system 30 constitute a lighting device which generates illumination light entering the color separation and light guide system 40 and the like.

The light source lamp unit 20 is a light source device which converges light emitted from a lamp main body 21 toward the surroundings and emits the converged light to illuminate the light modulation unit 60 via the illumination system 30 and the like. The light source lamp unit 20 has the lamp main body 21 as an arc tube, a sub mirror 22 having a spherical shape and reflecting source light emitted from the lamp main body 21 toward the front, a main mirror 23 having an ellipsoidal shape and reflecting the source light emitted from the lamp main body 21 toward the rear, and a concave lens 24 for collimation. In the light source lamp unit 20 having this structure, the substantially white source light emitted from the lamp main body 21 enters the main mirror 23 via the sub mirror 22 or directly to be reflected toward the front. Then, the reflected source light is emitted toward the illumination system 30 while collimated by the concave lens 24. The lamp main body 21 is generally constituted by a high pressure mercury lamp since this lamp can emit high luminance light throughout the wavelength ranges of respective color lights. However, the lamp to be incorporated in the light source lamp unit 20 is not limited to the high pressure mercury lamp but may be various types of light emission lamp such as LED or other solid light emission element. The main mirror 23 is not limited to the ellipsoidal mirror but may be various reflectors having reflection surface shapes such as a parabolic surface. When the main mirror 23 is a parabolic mirror, collimated light can be emitted from the light source lamp unit 20 without using the concave lens 24 or the like at a position downstream from the main mirror 23.

The illumination system 30 divides light emitted from the light source lamp unit 20 into a plurality of partial lights and supplies the partial lights such that these lights can be superimposed on a light receiving area as an illumination target for equalization of illuminance. The illumination system 30 also converts illumination light into polarized light having a particular direction. The illumination system 30 has a first multi-lens 31, a second multi-lens 32, a polarization conversion unit 34, and a superimposing lens 35.

The first multi-lens 31 is called a lens array as well, and has a function of a light division optical element which divides light emitted from the lamp main body 21 into a plurality of partial lights. The first multi-lens 31 contains a plurality of small lenses arranged in matrix on a plane perpendicular to a system optical axis OA. Each contour shape of the small lenses is so determined as to be substantially similar to each shape of the image forming areas of liquid crystal display panels 61r, 61g and 61b included the light modulation unit 60 which will be described later. The second multi-lens 32 is an optical element which converges the plural partial lights divided by the first multi-lens 31. The second multi-lens 32 contains a plurality of small lenses arranged in matrix on a plane perpendicular to the system optical axis OA similarly to the first multi-lens 31. However, each contour shape of the small lenses need not accurately corresponds to each shape of the image forming areas of the liquid crystal display panels 61r, 61g and 61b since the second multi-lens 32 is a lens for converging lights. The components of the first and second multi-lenses 31 and 32, the superimposing lens 35, and combining lenses 43a and 43b function as a light integrator which equalizes entering light by division and superimposition.

The polarization conversion unit 34 has a PBS array and a retardation film, and has a function of converting the respective partial lights divided by the first multi-lens 31 into one-directional linear polarized lights. Though details are not shown in the figure, the PBS array of the polarization conversion unit 34 has a structure where polarization separation layers and reflection mirrors inclined to the system optical axis OA are alternately disposed. The polarization separation layers of the PBS array transmit either P-polarized light or S-polarized light contained in the respective partial lights, and reflect the other polarized light. The other polarized light thus reflected is bended by the reflection mirrors of the PBS array, and emitted in the emission direction of the one polarized light, that is, in the direction along the system optical axis OA. Polarization of any part of the polarized light thus emitted is converted by the retardation film provided in stripes on the light exit surface of the polarization conversion unit 34 such that all the polarized lights have the same polarization direction. Since the light emitted from the lamp main body 21 is converted into one-directional polarized light by using the polarization conversion unit 34 having this structure, the source light utilization rate of the light modulation unit 60 can be enhanced.

The superimposing lens 35 converges the plural partial lights having passed through the first multi-lens 31, the second multi-lens 32, and the polarization conversion unit 34 in cooperation with the combining lenses 43a and 43b of the color separation and light guide system 40 which will be described later such that the converged lights entering the liquid crystal display panels 61r, 61g and 61b can be superimposed on the image forming areas of the respective panels. More specifically, the illumination lights having passed through both the multi-lenses 31 and 32 and the superimposing lens 35 passes the combining lenses 43a and 43b provided on the subsequent color separation and light guide system 40 for the control of the light condition. Then, the lights are superimposed on the illumination areas of the light modulation unit 60 to uniformly illuminate these areas, that is, the image forming areas of the liquid crystal display panels 61r, 61g and 61b for the respective colors.

The color separation and light guide system 40 has first and second dichroic mirrors 41a and 41b, a red light reflection mirror 42a, blue light reflection mirrors 42b and 42c, the combining lenses 43a and 43b, relay lenses 45 and 46, and a field lens 43r. In these components, the first and second dichroic mirrors 41a and 41b constitute a color separation system for dividing substantially white illumination light into three primary color lights. Each of the dichroic mirrors 41a and 41b is an optical element having a dielectric multi-layer film on a transparent substrate. This multi-layer film has a wavelength selection function for reflecting light in a predetermined wavelength range and transmitting light in the other wavelength range. Both the dichroic mirrors 41a and 41b are disposed inclined to the system optical axis OA. The first dichroic mirror 41a as the first color separation mirror reflects red light LR in the three color lights of red, green and blue (R, G and B), and transmits green light LG and blue light LB. The second dichroic mirror 41b as the second color separation mirror reflects the green light LG in the entering green light LG and blue light LB, and transmits the blue light LB. As a result, the illumination light emitted from the light source lamp unit 20 and entering the color separation and light guide system 40 via the illumination system 30 is separated into the red light LR which is reflected by the first dichroic mirror 41a and guided in the direction of a first optical path OP1 extending therefrom, the green light LG which pass through the first dichroic mirror 41a and then is reflected by the second dichroic mirror 41b and guided in the direction of a second optical path OP2 extending therefrom, and the blue light LB which passes through the first and second dichroic mirrors 41a and 41b and is guided in the direction of a third optical path OP3 extending therefrom.

The first combining lens 43a disposed on the first optical path OP1 of the color separation and light guide system 40 is a single lens with positive power which secures telecentric characteristics of the illumination system while decreasing the F number associated with the first optical path OP1 of the illumination system 30 to a value smaller than a certain fixed number in cooperation with the superimposing lens 35 of the illumination system 30. The combining lens 43a is disposed in a first section between the first dichroic mirror 41a and the red light reflection mirror 42a as a bending mirror on the first optical path OP1 extending from the superimposing lens 35 to the first liquid crystal display panel 61r. No lens is provided in a section between the superimposing lens 35 and the first dichroic mirror 41a and in a section between the red light reflection mirror 42a and the first liquid crystal display panel 61r. In other words, the combining lens 43a is disposed at a position within the range from $(\frac{1}{4})L_1$ to $(\frac{3}{4})L_1$ from the final end surface of the superimposing lens 35 assuming that the distance between the final end surface of the superimposing lens 35 and the image forming area, that is, the light modulation surface of the first liquid crystal display panel 61r is $L_1$.

The second combining lens 43b disposed on the second optical path OP2 of the color separation and light guide system 40 is a single lens with positive power which secures telecentric characteristics of the illumination system while decreasing the F number associated with the second optical path OP2 of the illumination system 30 to a value smaller than a certain fixed number in cooperation with the superimposing lens 35 of the illumination system 30. The combining lens 43b is disposed in a second section between the first dichroic mirror 41a and the second dichroic mirror 41b on the second optical path OP2 extending from the superimposing lens 35 to the second liquid crystal display panel 61g. No lens is provided in a section between the superimposing lens 35 and the first dichroic mirror 41a and in a section between the second dichroic mirror 41b and the second liquid crystal display panel 61g. In other words, the combining lens 43b is disposed at a position within the range from $(\frac{1}{4})L_2$ to $(\frac{3}{4})L_2$ from the final end surface of the superimposing lens 35 assuming that the distance between the final end surface of the superimposing lens 35 and the image forming area, that is, the light modulation surface of the second liquid crystal display panel 61g is $L_2$.

The pair of the relay lenses 45 and 46 disposed on the third optical path OP3 of the color separation and light guide system 40 supply an image formed immediately before the first relay lens 45 disposed on the light entrance side to the field lens 43r on the light exit side substantially with no change, thereby preventing decrease in light utilization efficiency caused by diffusion of light or for other reasons. Thus, both the relay lenses 45 and 46 compensate for the third optical path OP3 for blue light which is relatively longer than the first optical path OP1 for red light and the second optical path OP2 for green light. The blue light reflection mirrors 42b and 42c bend the blue light LB having passed through the first and second dichroic mirrors 41a and 41b twice to guide the blue light LB toward the liquid crystal display panel 61b.

The light modulation unit 60 has the three liquid crystal display panels 61r, 61g and 61b into which the three color illumination lights LR, LG and LB enter, respectively. The liquid crystal display panel 61for red light LR and a pair of polarizing filters 62r and 62r between which the liquid crystal display panel 61r is interposed constitute a liquid crystal light valve which two-dimensionally modulates luminance of illumination light according to image information. Also, the liquid crystal display panel 61g for green light LG and a pair of polarizing filters 62g and 62g between which the liquid crystal display panel 61g is interposed constitute a green light liquid crystal light valve. Similarly, the liquid crystal display panel 61b for the blue light LB and a pair of polarizing filters 62b and 62b constitute a blue light liquid crystal light valve. Each of the liquid crystal display panel 61r, 61g and 61b is formed by sealing liquid crystals as electro-optical substances between a pair of transparent glass substrates, and modulates the polarization direction of polarized light having entered the respective display panels according to a given image signal by using polysilicon TFTs as switching elements.

FIG. 2 is a cross-sectional side view illustrating one example structure of the liquid crystal light valve 61r and 62r constituting the light modulation unit 60. In the liquid crystal light valve shown in the figure, the first polarizing filter 62r as the polarizing element on the entrance side and the second polarizing filter 62r as the polarizing element on the exit side form a cross Nicol prism, for example. The liquid crystal display panel 61r sandwiched between the polarizing filters 62r and 62r varies the polarization direction of entering light for each pixel according to an input signal. The liquid crystal display panel 61r has a transparent first substrate 92a on the entrance side and a transparent second substrate 92b on the exit side with a liquid crystal layer 91 as a liquid crystal containing component interposed therebetween. An entrance side layer 93a containing a common electrode and an orientation film is provided on the liquid crystal layer 91 side surface of the first substrate 92a. On the other hand, an exit side layer 93b containing a transparent pixel electrode and a switching element is provided on the liquid crystal layer 91 side surface of the second substrate 92b. Though not shown in the figure, grid-shaped black matrix for dividing pixels is provided between the first substrate 92a and the entrance side layer 93a. Since the first substrate 92a and the second substrate 92b are only transparent substrates and do not have micro-lenses corresponding to the respective pixels, illumination light having entered the first polarizing filer 62r enters the liquid crystal layer 91 without convergence.

The green light liquid crystal light valve 61g and 62g and the blue light liquid crystal light valve 61b and 62b have structures similar to that of the red light liquid crystal light valve 61r and 62r discussed above.

Returning now to FIG. 1, the red light LR guided in the direction of the first optical path OP1 illuminates the image forming area within the liquid crystal display panel 61r via the red light reflection mirror 42a. The green light LG guided in the direction of the second optical path OP2 illuminates the image forming area within the liquid crystal display panel 61g via the second dichroic mirror 41b. The blue light LB guided in the direction of the third optical path OP3 illuminates the image forming area within the liquid crystal display panel 61b via the field lens 43r. The liquid crystal display panels 61r, 61g and 61b are non-emission and transmission type liquid modulation units which vary spatial distribution of the polarization direction of the entering illumination light. The liquid crystal display panels 61r, 61g and 61b control the polarization conditions of the respective color lights LR, LG and LB having entered the corresponding liquid crystal display panels 61b, 61g and 61b for each pixel according to driving signals or control signals inputted to the liquid crystal display panels 61r, 6g and 61b as electric signals. In this step, the polarizing filters 62r, 62g and 62b control the polarization directions of the illumination lights entering the liquid crystal display panels 61r, 61g and 61b, and extract modulated lights having a predetermined polarization direction from the lights emitted from the liquid crystal display panels 61r, 61g and 61b.

The cross dichroic prism 70 is a light combining system which combines optical images modulated for each of the color lights emitted from the corresponding polarizing filters 62r, 62g and 62b to form a color image. The cross dichroic prism 70 has a substantially square shape in the plan view formed by affixing four rectangular prisms, and a pair of dielectric multi-layer films 71 and 72 crossing each other in an X shape are provided on the boundaries of the affixed rectangular prisms. The first dielectric multi-layer film 71 of these multi-layer films 71 and 72 reflects the red light LR, and the other second dielectric multi-layer film 72 reflects the blue light LB. The cross dichroic prism 70 reflects the red light LR emitted from the liquid crystal display panel 61r by using the first dielectric multi-layer film 71 such that the red light LR can be emitted to the right with respect to the light traveling direction. The cross dichroic prism 70 directs the green light LG emitted from the liquid crystal display panel 61g such that the green light LG can be emitted straight by using the dielectric multi-layer films 71 and 72. The cross dichroic prism 70 reflects the blue light LB emitted from the liquid crystal display panel 61b by using the second dielectric multi-layer film 72 such that the blue light LB can be emitted to the left with respect to the light traveling direction.

The image light combined by the cross dichroic prism 70 passes through the projection system 80 as an enlarging and projecting lens to be projected on a screen (not shown) as a color image with an appropriate magnification rate.

According to the projector 10 in this embodiment described herein, the combining lens 43a operating in cooperation with the superimposing lens 35 is provided only in the first section between the first dichroic mirror 41a and the red light reflection mirror 42a as a bending mirror on the first optical path OP1 extending from the superimposing lens 35 to the first liquid crystal display panel 61r. Thus, the F number of illumination system (including combining lens 43a) which contains the illumination system 30 and the like associated with red light can be controlled with high degree of freedom. The F number of the illumination system 30 or the like is required to be an appropriate value according to the characteristics of the liquid crystal display panel 61r and the projection system 80. Particularly when a bright projection image is formed with increased utilization efficiency of light by using the projection system 80 having a small F number, it is preferable that the F number of the illumination system containing the illumination system 30 or the like is small. Thus, the F number of the illumination system containing the illumination system 30 or the like is set in the range from about 1.8 to about 2.3. According to this structure, the combining lens 43a is provided in place of a field lens disposed immediately before the first liquid crystal display panel 61r in the related art. Accordingly, the number of lenses constituting the color separation and light guide system 40 and the illumination system 30 does not increase, and therefore the manufacture cost and the size of the projector 10 do not rise. Moreover, according to the structure containing the combining lens 43a instead of the field lens, the incident angle of the illumination light does not become large around the first liquid crystal display panel 61r, and thus the telecentric characteristics of the illumination system including the illumination system 30 and the like associated with red light can be secured. Furthermore, the distance between the first multi-lens 31 and the second multi-lens 32 is reduced, which contributes to miniaturization of the illumination system including the illumination system 30 and the like. More specifically, since the combining focal distances of the lens system from the superimposing lens 35 to the liquid crystal display panels 61r and 61g are short due to the presence of the combining lens 43a, the distance from the first multi-lens 31 to the second multi-lens 32 can be reduced for constant projection magnification from the first multi-lens 31 to the liquid crystal display panels 61r and 61g.

According to the projector 10 in this embodiment, similarly to the case of the first optical path OP1, the combining lens 43b operating in cooperation with the superimposing lens 35 is provided only in the second section between the first dichroic mirror 41a and the second dichroic mirror 41b on the second optical path OP2 extending from the superimposing lens 35 to the second liquid crystal display panel 61g. Thus, the F number of the illumination system containing the illumination system 30 and the like associated with green light can be controlled with high degree of freedom. According to this structure, the combining lens 43b is provided in place of a field lens disposed immediately before the second liquid crystal display panel 61g in the related art. Accordingly, the number of lenses constituting the color separation and light guide system 40 and the illumination system 30 does not increase, and therefore the manufacture cost and the size of the projector 10 do not rise for the same reason of the first optical path OP1 described above. Moreover, according to the structure containing the combining lens 43b instead of the field lens, the incident angle of the illumination light does not become large around the second liquid crystal display panel 61g, and thus the telecentric characteristics of the illumination system including the illumination system 30 and the like associated with green light can be secured.

FIGS. 3A through 3C compare the position and image formation of the combining lens 43a shown in FIG. 1 with the positions and the image formations of combining lenses 143a and 243a in comparison examples. FIG. 3A shows image formation condition and the like of the combining lens 43a in the embodiment shown in FIG. 1. FIG. 3B shows image formation condition and the like of the combining lens 143a in a first comparison example which disposes the combining lens 143a excessively close to the superimposing lens 35. FIG. 3C shows image formation condition and the like of the combining lens 243a in a second comparison example which disposes the combining lens 243a excessively away from the superimposing lens 35.

When the combining lens 43a is disposed at a position in the range from ($\frac{1}{4}$)$L_1$ to ($\frac{3}{4}$)$L_1$ as shown in FIG. 3A, the F number of the illumination system including the illumination system 30 and the like can be controlled with relatively high degree of freedom as discussed above. In addition, since the number of lenses constituting the color separation and light guide system 40 and the illumination system 30 does not increase, the manufacturing cost and size of the projector 10 do not rise. Moreover, the incident angle of illumination light IL does not become large around the first liquid crystal display panel 61r, and thus the telecentric characteristics of the illumination system containing the illumination system 30 and the like can be secured.

When the combining lens 143a is disposed at a distance shorter than ($\frac{1}{4}$)$L_1$ as shown in FIG. 3B, the combining lens 143a is positioned away from the first liquid crystal display panel 61r. Thus, the refractive power of the combining lens 143a needs to be decreased when the F number of the illumination system including the illumination system 30 and the like is decreased to form images of the small lenses of the first multi-lens 31 on the first liquid crystal panel 61r without enlarging the superimposing lens 35. In this case, the condition of the illumination light IL entering the first liquid crystal display panel 61r is considerably shifted from the telecentric condition. Thus, the sizes of the superimposing lens 35 and the combining lens 143a increase and accordingly the sizes of the second multi-lens 32 and the polarization conversion unit 34 increase.

When the combining lens 243a is disposed at a distance longer than ($\frac{3}{4}$)$L_1$ from the superimposing lens 35 as shown in FIG. 3C, the combining lens 243a is positioned close to the first liquid crystal display panel 61r. Thus, the refractive power of the combining lens 243a becomes excessively large when the F number of the illumination system including the illumination system 30 and the like is decreased to form images of the small lenses of the first multi-lens 31 on the first liquid crystal panel 61r. In this case, the condition of the illumination light IL entering the first liquid crystal display panel 61r is considerably shifted from the telecentric condition. In addition, aberration is produced by the increased power of the combining lens 243a, which prevents entrance of the illumination IL into the first liquid crystal display panel 61r with high accuracy.

The invention has been described with reference to the embodiments, but it is not limited to the embodiments described herein, and it is therefore intended that various modifications and changes may be made without departing from the scope of the invention. For example, the following changes may be made.

While the red light LR, green light LG, and blue light LB are guided in the directions of the first optical path OP1, second optical path OP2, and third optical path OP3, respectively, according to this embodiment, these combinations may be freely varied by changing the designs of the first and second dichroic mirrors 41a and 41b included as the color separation system and other components. For example, the red light LR and green light LG can be guided in the direction of the long third optical path OP3. Alternatively, the blue light LB can be guided in the direction of the first optical path OP1, and the red light LR can be guided in the direction of the third optical path OP3.

While the projector 10 according to this embodiment projects the blue image formed by the superimposing lens 35 and the combining lens 43b on the third liquid crystal display panel 61b substantially with no change via the relay lenses 45 and 46 and the field lens 43r, the field lens 43r and the like of these components may be eliminated, for example. This is because the telecentric characteristics provided by the combining lens 43b can be utilized for the third optical path OP3 only by the presence of the relay lenses 45 and 46.

While the projector 10 according to this embodiment uses a high pressure mercury lamp or the like as the lamp main body 21 of the light source lamp unit 20, other various types of lamp capable of emitting substantially white illumination light, and solid light emission elements such as LED may be used.

While the illumination system 30 of the projector 10 according to this embodiment has the multi-lenses 31 and 32, the polarization conversion unit 34, and the superimposing lens 35, the multi-lenses 31 and 32 and other components may be eliminated, or replaced with a rod integrator.

The projector according to the invention is applicable to a front projection type projector which projects a projection image from the viewing side, and also applicable to a rear projection type projector which projects a projection image from the side opposite to the viewing side.

Figure 1:
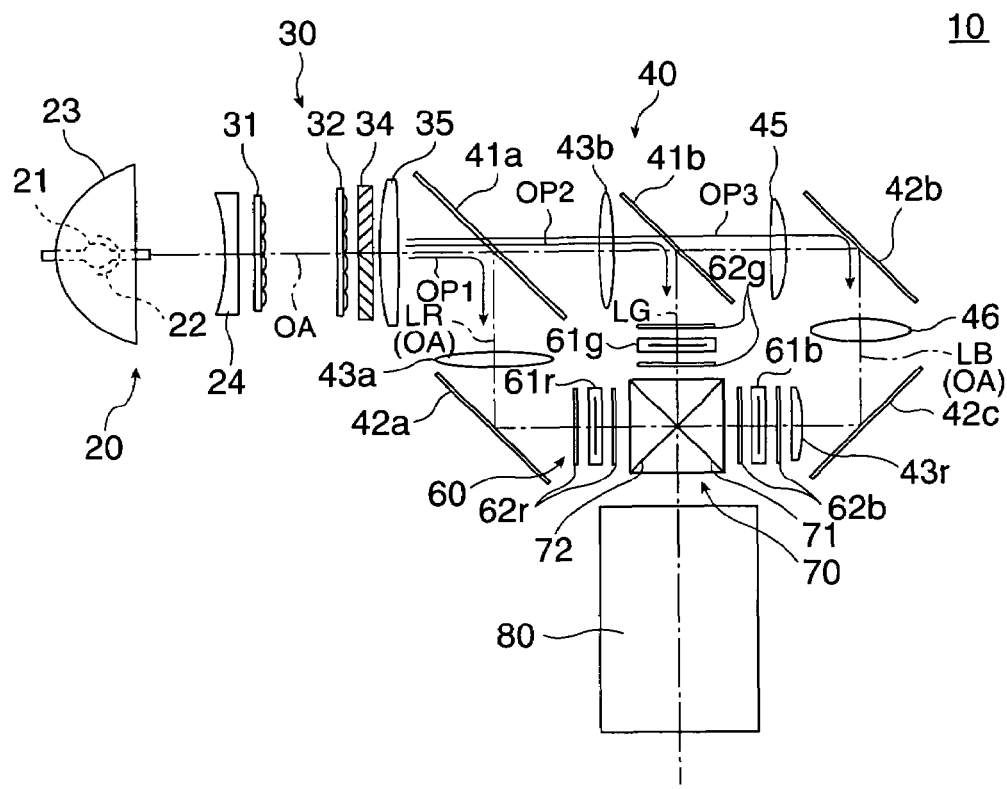
FIG. 1 is a plan view illustrating optical systems included in a projector according to a first embodiment.
Figure 2:
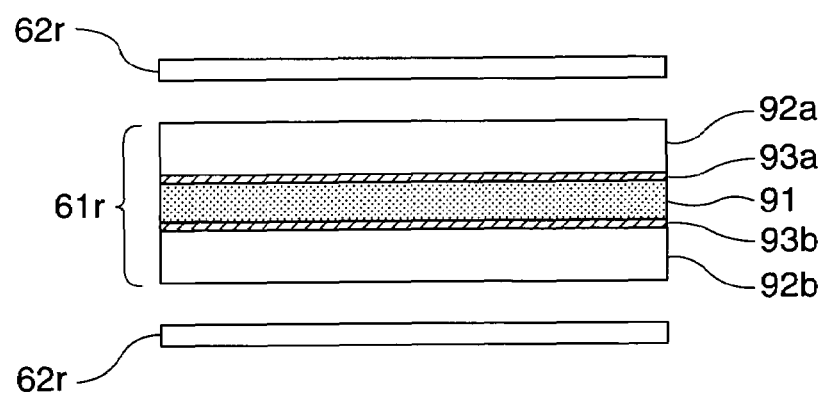
FIG. 2 is a cross-sectional side view illustrating a structure of a liquid crystal light valve.
Figure 3A:
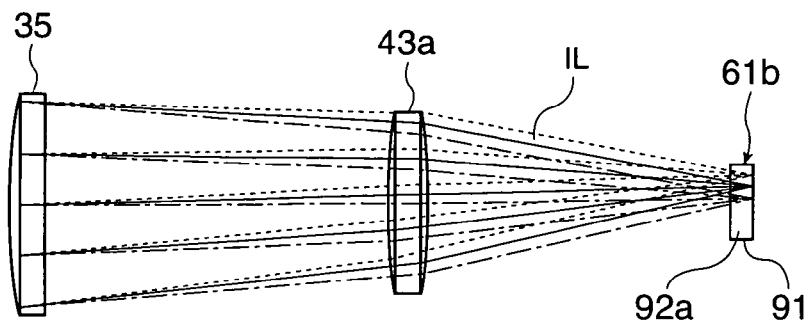
FIG. 3A illustrates a combining lens according to the embodiment.
Figure 3B:
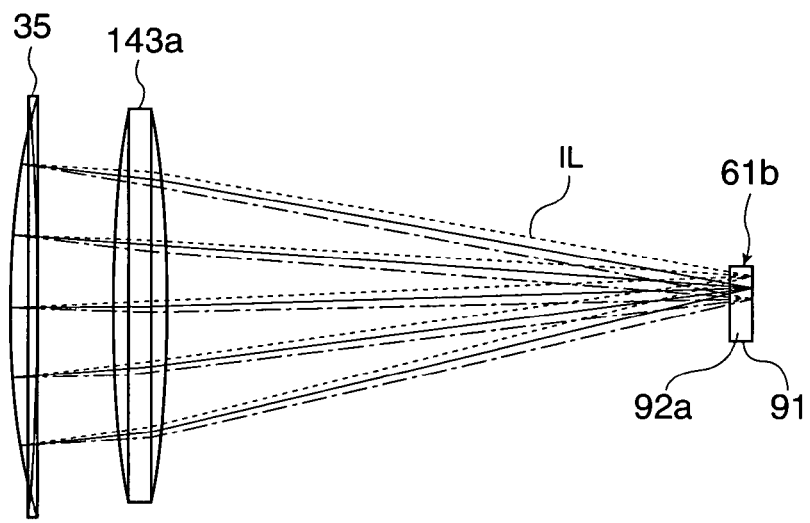
FIGS. 3B and 3C illustrate combining lenses in comparison examples.
Figure 3C:
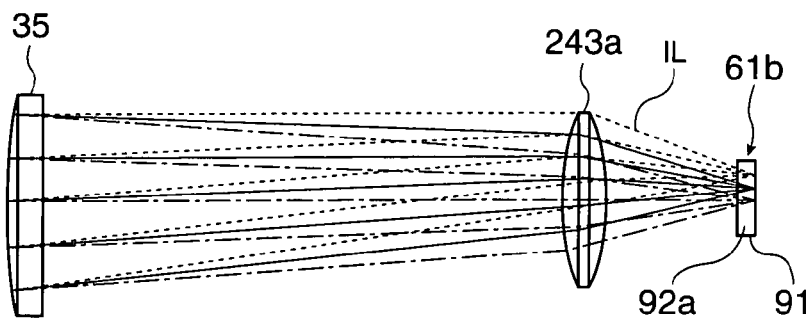

DESCRIPTION OF REFERENCE NUMERALS AND SIGNS 10 projector
20 light source lamp unit
21 lamp main body
22 sub mirror
23 main mirror
24 concave lens
31, 32 multi-lens
34 polarization conversion unit
35 superimposing lens
40 color separation and light guide system
41a first dichroic mirror
41b second dichroic mirror
42a, , 42b, 42c reflection mirror
43a, , 43b combining lens
45, 46 relay lens
61a, , 61g, 61b liquid crystal display panel
62a, , 62g, 62b polarizing filter
71 first dielectric multilayer film
72 second dielectric multilayer film
LR red light
LG green light
LB blue light
OA system optical axis
OP1 through OP3 first through third optical paths

The invention claimed is:

1. A projector, comprising:
a lighting device having a light source device which emits source light, first and second lens arrays which divides the source light emitted from the light source device into a plurality of partial lights, and a superimposing lens which has positive refractive power and supplies the partial lights emitted from the first and second lens arrays to a target illumination area such that the partial lights can be superimposed on the illumination area;
a color separation and light guide system having a first color separating mirror which separates illumination light emitted from the lighting device into first color light and other color light, a second color separating mirror which separates second color light and third color light contained in the other color light, and a bending mirror which further reflects the first color light reflected by the first color separation mirror to bend the optical path of the first color light;
first through third liquid crystal light valves each of which modulates corresponding one of the first through third color lights separated by the color separation and light guide system according to image information;
a light combining system which combines image lights in respective colors modulated by the first through third liquid crystal light valves; and
a projection system which projects the combined image light produced by the light combining system, wherein
an optical path extending from the superimposing lens to the first liquid crystal light valve has only a combining lens disposed in a first section between the first color separating mirror and the bending mirror,
wherein an optical path extending from the superimposing lens to the second liquid crystal light valve has only a combining lens disposed in a second section between the first color separating mirror and the second color separating mirror, and
wherein the combining lens disposed in the first section is a positive single lens located at a position in the range from ($\frac{1}{4}$)L to ($\frac{3}{4}$)L from the final end surface of the superimposing lens assuming that the distance between the final end surface of the superimposing lens and the light modulation surface of the first liquid crystal light valve is L.

2. The projector according to claim 1, wherein both the combining lens disposed in the section between the first color separating mirror and the bending mirror and the combining lens disposed in the section between the first color separating mirror and the second color separating mirror have refractive power which mutually corrects color aberration.

3. The projector according to claim 2, wherein the first through third liquid crystal light valves have no micro-lens.

4. The projector according to claim 1, wherein the combining lens disposed in the second section is a positive single lens located at a position in the range from ($\frac{1}{4}$)L to ($\frac{3}{4}$)L from the final end surface of the superimposing lens assuming that the distance between the final end surface of the superimposing lens and the light modulation surface of the second liquid crystal light valve is L.

5. The projector according to claim 4, wherein the first through third liquid crystal light valves have no micro-lens.

6. The projector according to claim 1, wherein the first through third liquid crystal light valves have no micro-lens.

7. A projector, comprising:
a lighting device having a light source device which emits source light, first and second lens arrays which divides the source light emitted from the light source device into a plurality of partial lights, and a superimposing lens which has positive refractive power and supplies the partial lights emitted from the first and second lens arrays to a target illumination area such that the partial lights can be superimposed on the illumination area;
a color separation and light guide system having a first color separating mirror which separates illumination light emitted from the lighting device into first color light and other color light, a second color separating mirror which separates second color light and third color light contained in the other color light, and a bending mirror which further reflects the first color light reflected by the first color separation mirror to bend the optical path of the first color light;

first through third liquid crystal light valves each of which modulates corresponding one of the first through third color lights separated by the color separation and light guide system according to image information;

a light combining system which combines image lights in respective colors modulated by the first through third liquid crystal light valves; and a projection system which projects the combined image light produced by the light combining system, wherein an optical path extending from the superimposing lens to the first liquid crystal light valve has only a combining lens disposed in a first section between the first color separating mirror and the bending mirror, wherein an optical path extending from the superimposing lens to the second liquid crystal light valve has only a combining lens disposed in a second section between the first color separating mirror and the second color separating mirror, wherein the combining lens disposed in the second section is a positive single lens located at a position in the range from $(\frac{1}{4})L$ to $(\frac{3}{4})L$ from the final end surface of the superimposing lens assuming that the distance between the final end surface of the superimposing lens and the light modulation surface of the second liquid crystal light valve is L.

8. The projector according to claim 7, wherein both the combining lens disposed in the section between the first color separating mirror and the bending mirror and the combining lens disposed in the section between the first color separating mirror and the second color separating mirror have refractive power which mutually corrects color aberration.

9. The projector according to claim 8, wherein the first through third liquid crystal light valves have no micro-lens.

10. The projector according to claim 7, wherein the first through third liquid crystal light valves have no micro-lens.

* * * * *